(12) United States Patent
Trotter et al.

(10) Patent No.: US 8,121,769 B2
(45) Date of Patent: Feb. 21, 2012

(54) VEHICLE DESCENT CONTROL

(75) Inventors: Loren M. Trotter, Linden, MI (US); Adam C. Chiappetta, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1160 days.

(21) Appl. No.: 11/773,806

(22) Filed: Jul. 5, 2007

(65) Prior Publication Data

US 2009/0012690 A1 Jan. 8, 2009

(51) Int. Cl.
- *B60T 8/52* (2006.01)
- *B60T 8/172* (2006.01)
- *B60T 8/32* (2006.01)
- *B60T 8/72* (2006.01)

(52) U.S. Cl. ......................................................... 701/70

(58) Field of Classification Search .................... 701/48, 701/70, 78, 83, 84; 303/192
See application file for complete search history.

(56) References Cited

U.S. PATENT DOCUMENTS

| | | | |
|---|---|---|---|
| 5,317,937 A | 6/1994 | Yoshizawa et al. | |
| 5,613,743 A * | 3/1997 | Kost et al. | 303/165 |
| 5,694,321 A * | 12/1997 | Eckert et al. | 701/91 |
| 5,748,474 A * | 5/1998 | Masuda et al. | 701/90 |
| 5,915,801 A * | 6/1999 | Taga et al. | 303/152 |
| 5,927,421 A * | 7/1999 | Fukada | 180/197 |
| 5,941,614 A | 8/1999 | Gallery et al. | |
| 6,058,347 A * | 5/2000 | Yamamura et al. | 701/96 |
| 6,089,677 A * | 7/2000 | Fukumura et al. | 303/112 |
| 6,122,587 A * | 9/2000 | Takahara et al. | 701/78 |
| 6,193,333 B1 | 2/2001 | Guest | |
| 6,243,640 B1 | 6/2001 | Beever | |
| 6,311,122 B1* | 10/2001 | Higashimata | 701/96 |
| 6,687,595 B2* | 2/2004 | Seto et al. | 701/96 |
| 6,692,090 B1 | 2/2004 | Heyn et al. | |
| 6,769,399 B2 | 8/2004 | Darnell | |
| 2001/0024062 A1* | 9/2001 | Yoshino | 303/152 |
| 2002/0145334 A1* | 10/2002 | Kitai et al. | 303/190 |
| 2002/0152015 A1* | 10/2002 | Seto | 701/96 |
| 2004/0117099 A1* | 6/2004 | Inagaki et al. | 701/70 |
| 2006/0287798 A1* | 12/2006 | Inoue et al. | 701/70 |

FOREIGN PATENT DOCUMENTS

EP 754588 A1 * 1/1997

* cited by examiner

*Primary Examiner* — Mark Hellner
*Assistant Examiner* — Ari M Diacou
(74) *Attorney, Agent, or Firm* — Ralph E. Smith

(57) ABSTRACT

Vehicle descent is controlled in at least one implementation by comparing an engine braking torque to a target engine braking torque, and controlling one or more vehicle brakes to maintain the engine braking torque substantially at the target engine braking torque. The target engine braking torque may be varied as a function of one or more factors or conditions, such as accelerator position or brake application pressure.

6 Claims, 3 Drawing Sheets

VEHICLE DESCENT CONTROL

FIELD OF THE INVENTION

The present invention relates generally to vehicle controls, and more particularly to controlling descent of a vehicle along sloped terrain.

BACKGROUND OF THE INVENTION

Engine braking is used to control descent of a vehicle traveling along sloped terrain. Engine braking uses a compression stroke of the vehicle's internal combustion engine to dissipate energy transmitted to the engine from the vehicle's wheels through the vehicle's driveline and transmission. A vehicle driver may downshift the transmission into a lower transmission speed ratio and rely on engine braking to slow a descending vehicle. But on steep off-road terrain, engine braking alone may be insufficient, even in the lowest transmission speed ratio. Therefore, vehicle descent may be further controlled by automatically controlling the vehicle's brakes to supplement the engine braking.

For example, so-called hill descent control (HDC) systems maintain a constant low speed of a vehicle descending a steep hill without driver input. More specifically, HDC systems detect vehicle speed via wheel rotation, compare the detected vehicle speed to a target vehicle speed, and apply the vehicle's brakes when the detected vehicle speed exceeds the target vehicle speed. But this approach may not be optimal for all situations, such as when vehicle speed is difficult to assess because the vehicle's wheels are slipping, freewheeling, or momentarily locked up by the vehicle's brakes.

SUMMARY OF THE INVENTION

An implementation of a presently preferred method of controlling descent of a vehicle includes monitoring engine braking torque and comparing engine braking torque to a target engine braking torque. One or more brakes are applied when the engine braking torque is less than the target engine braking torque, and released when the engine braking torque is greater than or equal to the target engine braking torque. Accordingly, descent of the vehicle may be automatically controlled without a driver having to manually apply the brakes.

An implementation of a presently preferred vehicle includes a plurality of wheels, a plurality of brakes for slowing rotation of the wheels, a driveline coupled to at least one of the wheels, a transmission coupled to the drive-line, and an engine coupled to the transmission. The vehicle also includes at least one controller to control engine and brake operation and carry out the following steps: comparing actual engine braking torque to a target engine braking torque; applying at least one of the brakes when actual engine braking torque is less than the target engine braking torque; and releasing the brake(s) when actual engine braking torque is greater than the target engine braking torque.

Another implementation of a presently preferred method includes controlling descent of a vehicle automatically without a driver having to manually apply brakes of the vehicle. According to the method, an engine braking torque is compared to a target engine braking torque, and one or more of the brakes of the vehicle are controlled so as to maintain the engine braking torque substantially at the target engine braking torque, which may be varied as a function of at least one of accelerator position or brake application pressure.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
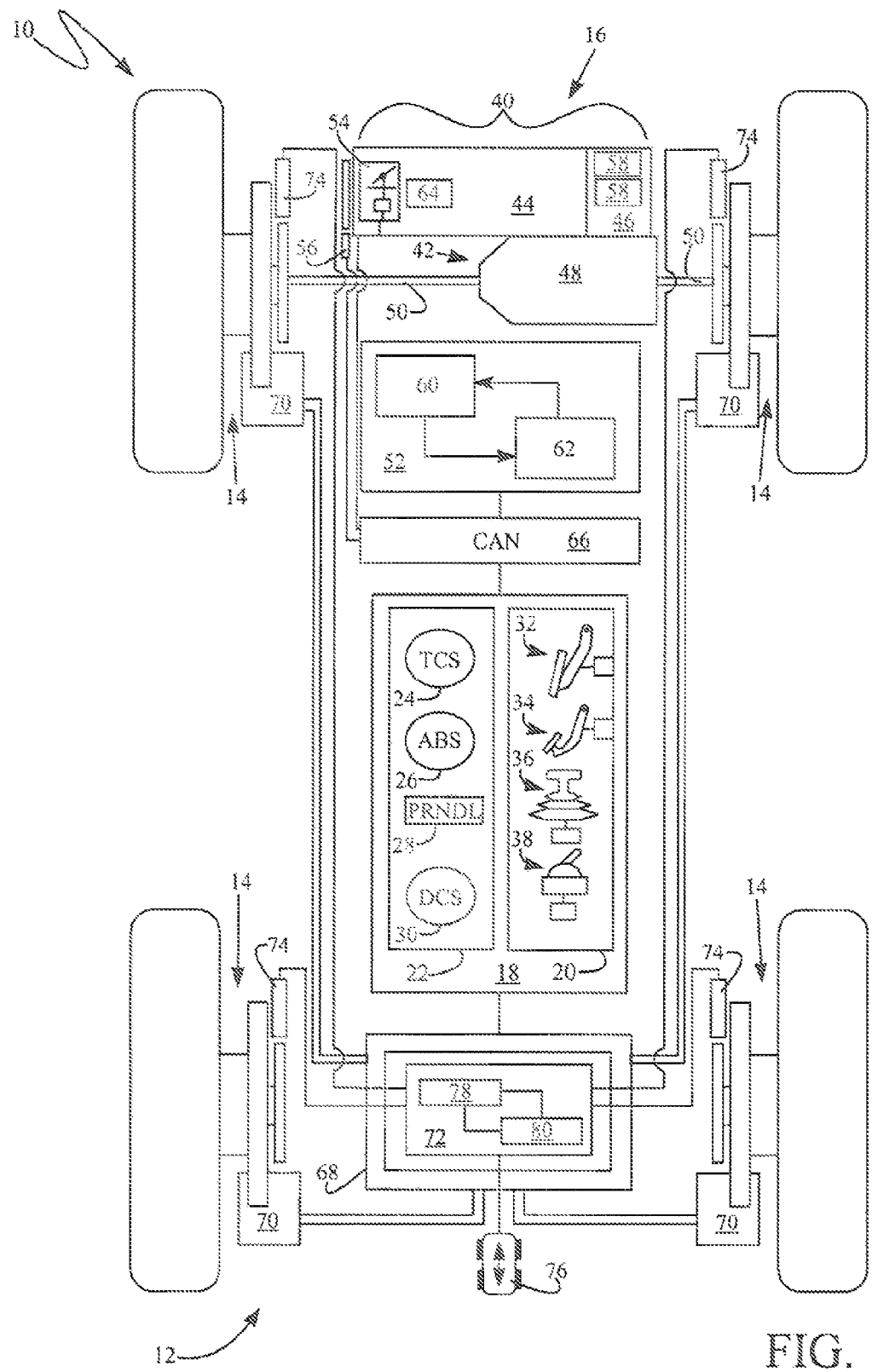
FIG. 1 is a schematic view of an embodiment of a vehicle including apparatus to carry out vehicle descent control.

Referring, in more detail to the drawings, FIG. 1 illustrates a schematic diagram of an exemplary vehicle 10 configured for automatically controlled descent based on engine braking torque. The vehicle 10 may include a chassis system 12 including wheels 14, a drivetrain system 16 to rotate the wheels 14, and a driver interface 18 in communication with the chassis and drivetrain systems 12, 16.

The driver interface 18 receives input from and transmits output to a vehicle driver. The driver interface 18 generally can include input devices 20 to receive commands or requests from the driver, and output devices 22 to transmit vehicle information back to the driver. The output devices 22 of the driver interface may include a traction control system (TCS) lamp 24, an anti-lock braking system (ABS) lamp 26, a transmission mode display 28, a descent, control system (DCS) lamp 30, or the like. The driver interface input, devices 20 may include an accelerator sensor 32 that may be coupled to an accelerator pedal or the like (not shown), and a brake sensor 34 that may be coupled to a brake pedal or the like (not shown). The input devices 20 may further include a transmission mode sensor 36 that may be coupled to a transmission selector or the like (not shown) to receive requests from the driver for different modes of transmission operation, and a descent mode sensor 38 that may be coupled to a descent mode switch of any kind (not shown). For example, a vehicle driver may activate the descent mode switch and sensor 38 when the driver desires to descend sloped terrain using automatic control.

The drivetrain system 16 generates, multiplies, and conveys rotational power to the wheels 14 to propel the vehicle 10 down the road. The drivetrain system 16 may include a powertrain 40 to develop rotational, power and a driveline 42 coupled between the powertrain 40 and the wheels 14 to deliver the rotational power from the powertrain 40 to the wheels 14 and against, terrain to propel the vehicle 10 along the terrain. The powertrain 40 may include an engine 44 to generate rotational power and a transmission 46 coupled to the engine 44 to leverage the rotational power of the engine 44. The engine 44 may also provide engine braking torque to dissipate energy transmitted to the engine 44 from the vehicle's wheels 14 through the vehicle's driveline 42 and transmission 46 and thereby slow vehicle descent. The driveline 42 may include a torque transfer device 48 such as an axle, differential, transfer case, or the like, and shafts 50 such as driveshafts, halfshafts, or the like.

The drivetrain system 16 may also include one or more drivetrain controllers 52 to receive input from various vehicle sensors, process the input with programs and data, and transmit output to other vehicle components or systems. The drivetrain controller(s) 52 may include one or more engine and/or transmission controllers, which may be separate or integrated into one or more units. The drivetrain system 10 may also include drivetrain sensors, which may include the accelerator sensor 32 to indicate commanded engine performance (e.g.

demanded torque), an engine throttle sensor 54 coupled to an engine throttle (not shown) to indicate engine demand or load, an engine speed sensor 56 coupled to a rotational component of the engine 44 such as a crankshaft, camshaft, or the like, and one or more transmission speed sensors 58, which may be used to indicate transmission speed ratio(s). Any other drivetrain sensors may be used, such as to indicate torque, speed, or any other parameter, of any of the engine 44, transmission 46, torque transfer device 48, or the like. The drivetrain controller 52 may include one or more processors 60 to execute instructions using sensor input and data, and memory 62 coupled to the processor(s) 60 in any manner thereto and configured to store the instructions, sensor input, and data. The instructions may include algorithms to determine any drivetrain parameters including engine torque, transmission speed rations), and the like.

The engine torque can be determined in any suitable, manner, including directly from one or more engine torque sensors (not shown), or indirectly from monitoring other drivetrain parameters and then calculating or looking up engine torque based on those parameters. For example, engine torque may be inferred from monitoring and processing of signals from any suitable engine sensors, such as the throttle position sensor 54, an engine pressure sensor 64 such as a manifold pressure sensor or cylinder pressure sensor, and/or the like, using engine torque look up tables, maps, or the like. From the controller 52, drivetrain controller signals may be output to the engine 44, transmission 46, torque transfer device 48, and one or more other vehicle controllers such as via a controller area network (CAN) 66.

The chassis system 12 may structurally support the drivetrain system 16 in any suitable manner and, generally, may also enable vehicle steering, suspension, braking, and the like. The chassis system 12 may include the wheels 14, a vehicle braking system 68 that may include wheel brakes 70 to slow rotation of the wheels 14 and one or more chassis controllers 72 to control vehicle braking, and the like. The vehicle braking system 68 is configured to slow the speed of the vehicle 10, such as by applying the wheel brakes 70 to fractionally engage the wheels 14 to slow rotation thereof. The vehicle braking system 68 may include any suitable type of vehicle brakes including the wheel brakes 70, drivetrain braking devices, or the like. For example, the wheel brakes 70 may be part of a wheel braking system including a master cylinder, brake fluid reservoir, brake booster, brake fluid circuits including valves, hoses, pipes, and the like (not all shown). The wheel brakes 70 may include caliper disc brakes, drum brakes, or the like.

The chassis controller(s) 72 receives input from various sensors, processes the input with programs and data, and transmits output to other vehicle components or systems. The sensors may include any vehicle sensors such as the drivetrain sensors 32, 54, 64, or chassis sensors. For example, the chassis sensors may include wheel speed sensors 74 such as proximity sensors operatively coupled to toothed portions of the wheels 14, the brake sensor 34, or a hydraulic pressure sensor in a brake fluid circuit (not shown), or the like. The chassis sensors may also include the descent mode sensor 38, and a vehicle descent sensor 76 carried by the vehicle 10 such as a longitudinal accelerometer,inclinometer, or the like. The vehicle descent sensor 76 may sense when the vehicle 10 is in descent, such as traversing a downward slope of terrain.

The chassis system controller 72 may include one or more of an anti-lock braking system (ABS) controller, an electronic stability program (ESP) controller, a traction control system (TCS) controller, a hill descent controller (HDC), or the like. Such controllers may be separate or may be integrated into one or more units. In any case, the controllers 72 may include one or more processors 78 to execute instructions using sensor input and data, and memory 80 coupled to the processors) 78 in any manner thereto and configured to store the instructions, sensor input, and data. The instructions can include algorithms to determine any chassis parameters including wheel speed, wheel lock up, wheel slippage or freewheeling, vehicle inclination or declination, brake pressure(s), and/or the like. From the chassis controller 72, chassis controller output signals may be output to the vehicle braking system 68, and one or more other vehicle controllers such as the drivetrain controller 52.

Figure 2A:
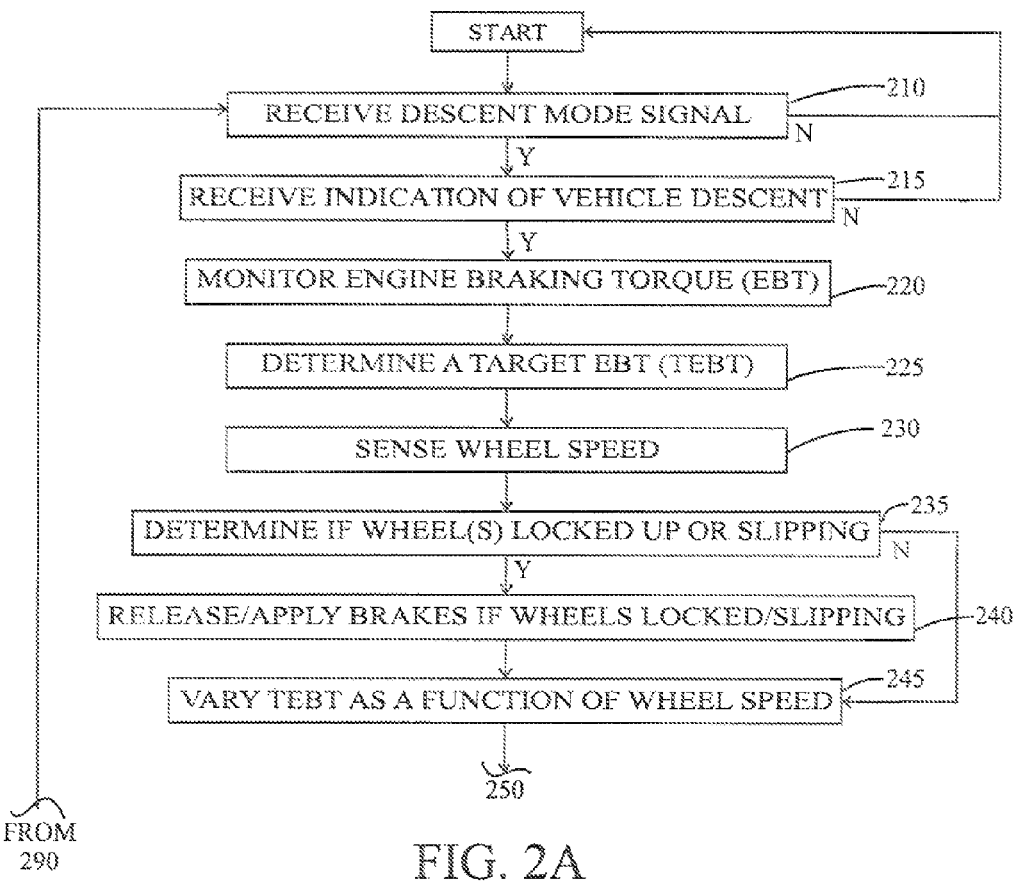
FIG. 2 is a flow chart of an embodiment of a method of vehicle descent control.
Figure 2B:
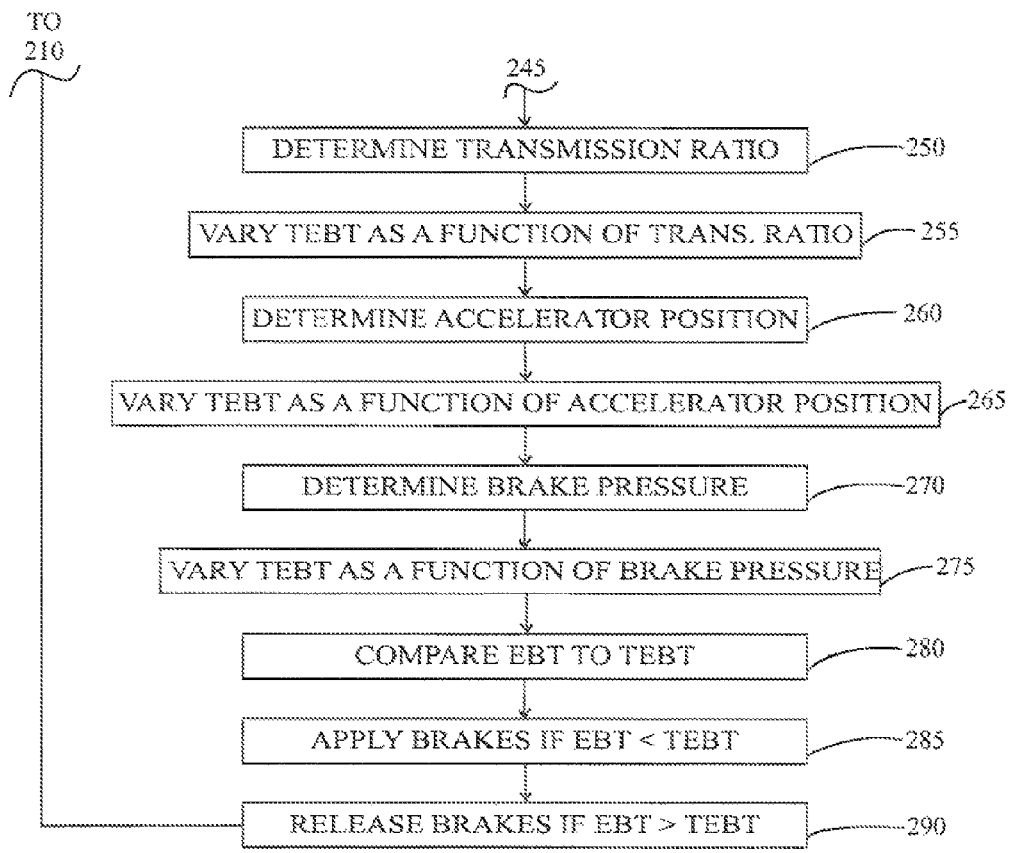

FIG. 2 illustrates an embodiment of a method 200 of automatically controlling descent of a vehicle, such as the vehicle 10 of FIG. 1. Generally, according to the method 200, descent of a vehicle may be controlled based on engine braking torque, and without driver input, such as a driver manually applying the brakes 70 of the vehicle 10. Nonetheless, the method 200 may be carried out despite a driver applying the brakes 70 or applying an accelerator. The method 200 may be carried out in any suitable sequence of two or more of its steps. In other words, 200 the method need not include all of the steps nor in the exact sequence described. The method 200 may be manifested in a software program stored and implemented by one or more vehicle controllers such as the chassis controller 72 and/or drivetrain controller 52. Also, the method 200 may be an individual sub-routine of a comprehensive vehicle control program, may be distributed as various steps throughout such a control program, or may be a stand-alone descent control program, or the like.

At step 210, a descent mode signal may be received, such as by the chassis controller 72 from the descent mode switch 38. The descent mode signal may be used to initiate the subsequent method steps. For example, if the descent mode signal is not received, then the method 200 may loop back to start as shown. However, the rest of the method 200 may be carried out with or without receiving the descent mode signal.

At step 215, an indication of vehicle descent may be received, such as by the chassis controller 72 from the vehicle descent sensor 76. The vehicle descent indication may be received before proceeding with the subsequent method steps. For example, if the indication is not received, then the method may loop back to start as shown. Alternatively, the indication need not be received such that the method 200 may be performed as a default operation, regardless of whether the vehicle is in descent or not. For example, a vehicle may descend a sloped terrain, then encounter a generally flat or horizontal terrain before descending another sloped terrain, in this case, a vehicle driver may find it annoying to have the vehicle switch in and out of the automatic vehicle descent control mode. In such a case, the method 200 may be continuously active.

At step 220, engine braking torque may be monitored, such as by the chassis controller 72 via the drivetrain controller 52. For example, the drivetrain controller 52 may determine engine braking torque in any manner and transmit engine braking torque signals to the chassis controller 72, such as via the CAN 66. Those skilled in the art will recognize that engine braking torque may be synonymous with negative engine torque, engine drag torque, or engine coasting torque. In other words, engine torque may encompass both positive engine torque and negative engine torque (engine braking torque).

At step 225, a target engine braking torque may be determined. For example, the drivetrain controller 52 may receive engine braking torque signals by monitoring other drivetrain parameters and then calculating or looking up engine braking torque based on those parameters. More specifically, engine braking torque may be calibrated and inferred from monitoring and processing of signals from the throttle position sensor 54, the engine pressure sensor 64, and/or other like sensors, using engine braking torque formulas, look up tables, maps, and/or the like.

At step 230, wheel speed may be sensed. For example, the wheel speed sensors 74 may sense speed of the wheels 14 and convey sensor signals to one or both of the controllers 52, 72.

At step 235, wheel speed may be monitored for wheel lock up and/or slippage. For example, the chassis controller 72 may monitor the wheel speed from the sensors 74 for any slippage or lock up of the wheels 14. If there is no wheel slippage and no lock up, then the method may proceed to step 245, otherwise to step 240.

At step 240, brakes may be automatically released to avoid wheel lock up, and automatically applied to avoid wheel slippage. For example, the chassis controller 72 may send output signals to the brakes 70 to release them, if wheel lock up is detected, or to apply them if wheel slippage is detected, such as via ABS controls.

At step 245, target engine braking torque may be varied as a function, of the sensed wheel speed. For example, the chassis controller 72 may increase target engine braking torque as wheel speed increases, and decrease target engine braking torque as wheel speed decreases.

At step 250, a transmission speed ratio may be determined. For example, the engine controller 52 may receive input signals from the transmission speed sensors 58 and may determine the transmission speed ratio(s) by cross referencing known transmission speed ratios with the speed sensor signals with or without other sensor signals. Those skilled in the art will recognize that transmission speed ratio(s) may be determined in any suitable manner.

At step 255, a target engine braking torque may be varied as a function of transmission speed ratio. For example, the chassis controller 72 may receive the detected transmission speed ratio from the engine controller 52, and may increase the target engine braking torque as the transmission speed ratio increases and decrease the target engine braking torque as the transmission speed ratio decreases.

At step 260, an accelerator position may be determined. For example, the engine controller 52 may receive signals from the accelerator sensor 32 and process those signals to determine the accelerator position. Those skilled in the art will recognize that accelerator position may be determined in any suitable manner.

At step 265, a target engine braking torque may be varied as a function of accelerator position. For example, the chassis controller 72 may receive the detected accelerator position from the engine controller 52, and may decrease the target engine braking torque as the accelerator position advances and increase the target engine braking torque as accelerator position retracts. Accordingly, the method may be carried out with driver input, such as when a driver depresses an accelerator pedal.

At step 270, brake application pressure may be sensed. For example, the brake pressure sensor 34 may be used to sense pressure that a driver applies to a brake pedal.

At step 275, target engine braking torque may be varied as a function of brake application pressure. For example, the chassis controller 72 may decrease target engine braking torque as brake application pressure increases and may increase target engine braking torque as brake application pressure decreases. Accordingly, the method may be carried out with driver input, such as when a driver depresses a brake pedal.

At step 280, engine braking torque may be compared to a target engine braking torque. The target engine braking torque may be developed and calibrated by empirical testing, formulaic modeling, theoretical calculations, or the like, and may vary for each type of vehicle, vehicle configuration, or the like. For example, models may be developed from actual testing and may include lookup tables, formulas, maps, and/or the like that may cross-reference target engine braking torque values with other vehicle parameter values. The target engine braking torque may be varied according to any suitable vehicle parameters such as transmission speed ratio, accelerator position, vehicle declination, braking force, wheel speed, wheel slippage, wheel lock-up, and/or the like.

Thereafter, brakes may be automatically controlled so as to help maintain engine braking torque substantially at the target engine braking torque. The target engine braking torque may include a setpoint value, a range of values, or the like. Accordingly, the engine braking torque, may be maintained substantially at the target, when the engine braking torque is within a target engine braking torque range, or within a predetermined percentage of a target engine braking torque setpoint, or the like. In other words, the brakes may be automatically controlled to supplement engine braking torque, such as when engine braking torque alone is insufficient to automatically control vehicle descent.

For example, at step 285, one or more brakes may be applied when engine braking torque is less than a target engine braking torque. For example, if engine braking torque falls below a target value or target range of values, then the chassis controller 72 may transmit suitable signal(s) to apply one or more of the brakes 70. As used herein, the term "apply" brakes includes increasing braking pressure. Accordingly, descent of the vehicle is automatically controlled such that a driver does not have to manually apply the brakes.

In another example, at step 290, one or more brakes may be released when engine braking torque is greater than a target engine braking torque. For example, if engine braking torque rises above a target value or target range of values, then the chassis controller 72 may transmit suitable signals) to release one or more of the brakes 70. As used herein, the term "release" brakes includes decreasing braking pressure or removing braking pressure. The method 200 may loop continuously from step 210 through step 290, and, for example, may end when indications of vehicle descent are no longer received at step 215, such as when the vehicle 10 is no longer traversing downwardly sloped terrain as indicated by the vehicle descent sensor 76. Or the method 200 may end when the descent mode signal is no longer received at step 210, such as when the driver turns off the descent mode switch and sensor 38.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. A method of controlling descent of a vehicle, the method comprising the steps of:
   sensing brake application pressure and varying a target engine braking torque as a function of the sensed brake application pressure where the target engine braking torque is decreased as the sensed brake application pressure increases and is increased as the sensed brake application pressure decreases;
   monitoring engine braking torque;

comparing the engine braking torque to the target engine braking torque;

applying at least one brake when the engine braking torque is less than the target engine braking torque; and releasing at least one applied brake when the engine braking torque is greater than the target engine braking torque.

2. The method of claim 1, further comprising:

receiving an indication that the vehicle is in descent.

3. The method of claim 1, wherein the indication of vehicle descent is received from a longitudinal accelerometer on the vehicle.

4. The method of claim 1, wherein the engine braking torque is monitored as a signal received from an engine controller.

5. The method of claim 4, wherein the engine braking torque is monitored by, and compared to the target engine braking torque using, a chassis system controller.

6. A method of controlling descent of a vehicle automatically without a driver having to apply brakes of the vehicle, the method comprising the steps of:

comparing an engine braking torque to a target engine braking torque; and controlling one or more of the brakes of the vehicle so as to maintain the engine braking torque substantially at the target engine braking torque;

wherein the target engine braking torque is varied as an inverse function of brake application pressure whereby the target engine braking torque is decreased as the brake application pressure increases and increased as the brake application pressure decreases.

* * * * *